United States Patent [19]

Masuda

[11] Patent Number: 4,596,419
[45] Date of Patent: Jun. 24, 1986

[54] MOVABLE ROOF APPARATUS FOR VEHICLES

[75] Inventor: Mitsuyoshi Masuda, Nagoya, Japan
[73] Assignee: Aisin Seiki Kabushiki Kaisha, Kariya, Japan
[21] Appl. No.: 600,767
[22] Filed: Apr. 16, 1984
[30] Foreign Application Priority Data
Apr. 28, 1983 [JP] Japan .................. 58-75629
[51] Int. Cl.$^4$ .................. B60J 7/04
[52] U.S. Cl. .................. 296/221; 296/223; 296/222
[58] Field of Search .................. 296/221, 222, 223
[56] References Cited

U.S. PATENT DOCUMENTS

| | | | |
|---|---|---|---|
| 4,272,122 | 6/1981 | Schätzler et al. | 296/221 |
| 4,403,805 | 9/1983 | Strem, Jr. et al. | 296/222 |
| 4,417,763 | 11/1983 | Schlapp et al. | 296/221 |
| 4,420,184 | 12/1983 | Kaltz | 296/222 |
| 4,422,687 | 12/1983 | Kaltz et al. | 296/223 |

FOREIGN PATENT DOCUMENTS 1346506 4/1971 United Kingdom .

Primary Examiner—Robert R. Song
Attorney, Agent, or Firm—Oblon, Fisher, Spivak, McClelland & Maier

[57] ABSTRACT

A movable roof apparatus for vehicles includes a movable roof disposed on a roof of the vehicle so as to open and close an aperture formed in the roof. Seal member is provided on a rim portion of one of the movable roof, thereby the movable roof being positioned in the aperture in the airtight state. A driving mechanism is provided on the roof and operatively connected with the movable roof through a cam mechanism for moving the movable roof. The cam mechanism is provided in series with an open position where the movable roof is retreated from the aperture and positioned at one side of the roof so that the aperture is opened a first engaging position where the movable roof is disposed in the aperture, a passing position where the movable roof slightly passes through the roof and is positioned at the other side of the roof, and a second engaging position where the movable roof is disposed in the aperture so that the movable roof is surely disposed in the aperture since the movable roof is oscilated in the aperture.

2 Claims, 10 Drawing Figures

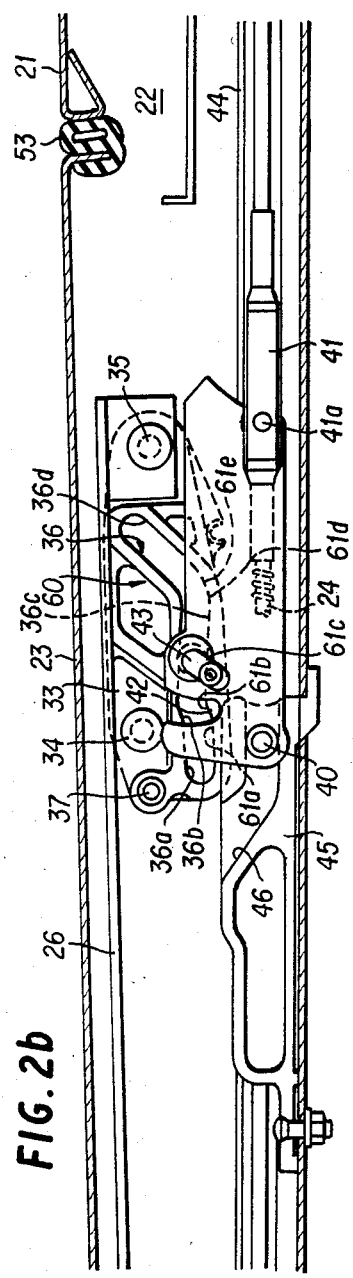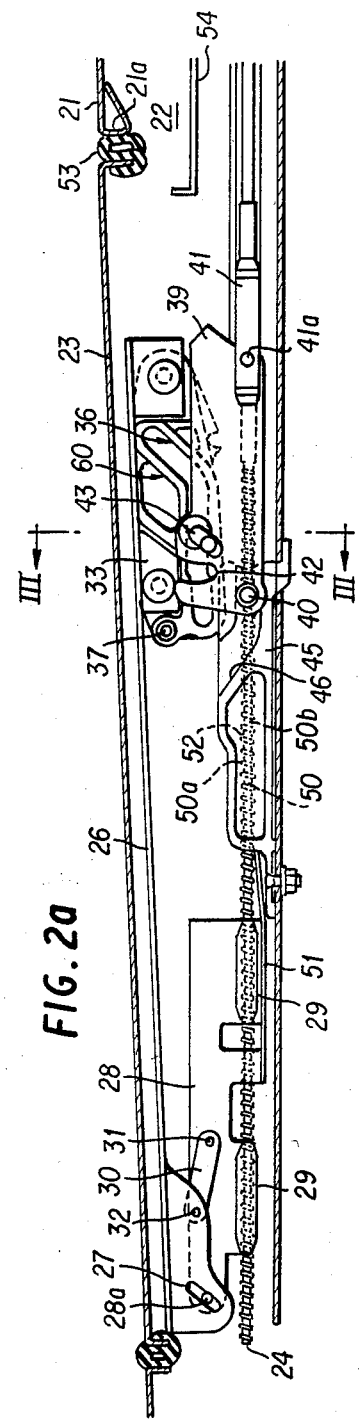

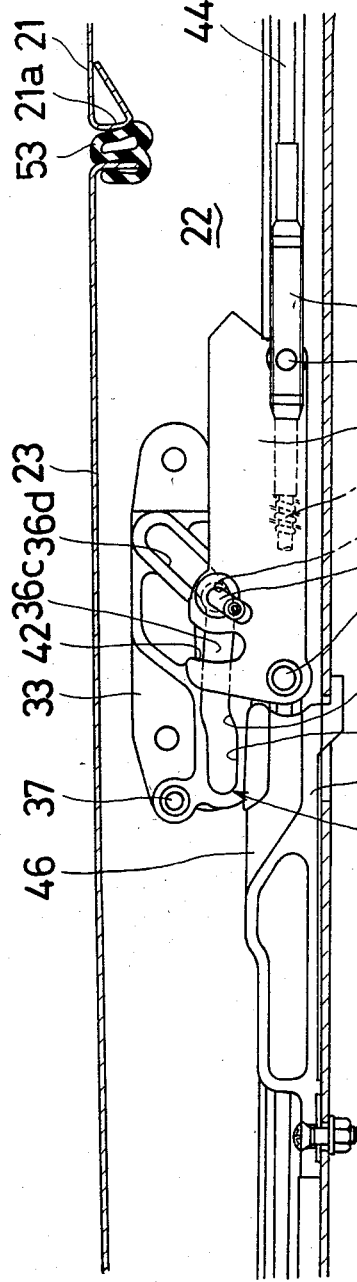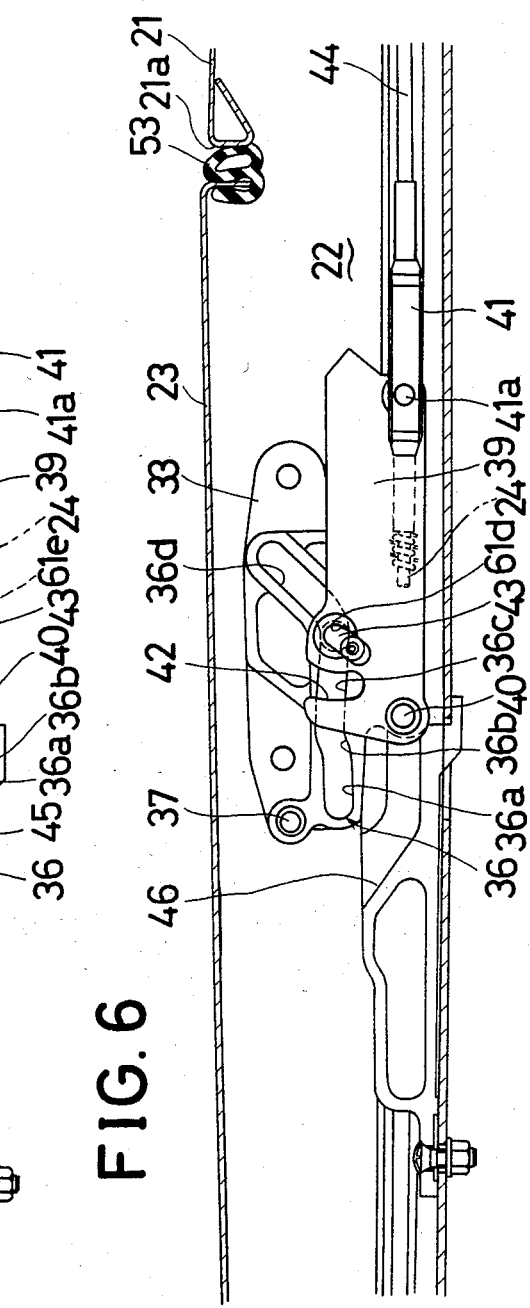

MOVABLE ROOF APPARATUS FOR VEHICLES

BACKGROUND OF THE INVENTION

1. Field of the Invention

The present invention relates to a movable roof apparatus for vehicles wherein an aperture formed on a fixed roof of the vehicle is closed by a movable roof fitted therein in accordance with a driving mechanism operatively connected with the movable roof and more particularly to an improvement of the driving mechanism thereof.

2. Description of the Prior Art

A conventional movable roof apparatus for vehicles includes a movable roof movably disposed on the fixed roof of the vehicle and a driving mechanism for moving the movable roof between an open and closed positions in an aperture formed on the roof of the vehicle.

The movable roof is fitted into the aperture at the closed position so that when the aperture is closed, the movable roof is in the same plane with the roof and does not project from the roof. Therefore, the driving mechanism has a cam mechanism operatively connected with the movable roof. As the movable roof is lifted upwardly or pulled downwardly through the cam mechanism of the driving mechanism, the movable roof is engaged with or disengaged from the aperture for closing or opening the aperture. Further, a weather strip made of a resilient material is provided along a rim portion of the movable roof. As the weather strip resiliently abuts against a rim portion of the aperture at the closed position, the movable roof is liquid-tightly positioned in the aperture.

However, under the free state, the size of the weather strip is a little larger than that of the aperture. Thus, when the movable roof is lifted upwardly or pulled downwardly toward the aperture for positioning the movable roof at the closed position, the end portion of the weather strip frictionally abuts against a lower or an upper surface of the roof around the aperture. As the lifting movement of the movable roof is disturbed by this abutment, the movable roof is not perfectly fitted in the aperture. This results in the movable roof being projected from the roof even at the closed position by riding over the deformed weather strip. Thus, as a stepped portion exists between the roof and the movable roof, the appearance of the roof will be detracted from by the stepped portion on the roof and the liquid-tightness or air-tightness of the weather strip will not be sufficient to prevent water leakage.

SUMMARY OF THE INVENTION

It is, therefore, a primary object of the invention to provide an improved movable roof apparatus for vehicles in which the movable roof is fitted in the aperture at the closed position without any stepped portion being formed between the fixed roof and the movable roof by oscillation of the movable roof in the aperture in operation.

Another object of the invention is to realize the above improved movable roof apparatus for vehicles by use of a simple construction.

According to the invention, the driving mechanism provided on the roof has the cam mechanism operatively connected with the movable roof so as to move the movable roof between the open and closed positions. The cam mechanism is provided with an open position where the movable roof is positioned at one side of the roof for opening the aperture, a first engaging position where the movable roof is disposed in the aperture, a passing position where the movable roof is slightly moved towards the other side of the roof and a second engaging position where the movable roof is fitted in the aperture.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2a is a sectional view taken along line II—II shown in FIG. 1;

FIG. 2b is a partial enlarged sectional view showing the rear end of the movable roof apparatus;

FIGS. 4 to 9 are partial sectional views of the rear end of the movable roof apparatus of a construction similar to FIG. 2b, but showing the operational conditions of the cam mechanism.

DESCRIPTION OF THE PREFERRED EMBODIMENT

Figure 1:
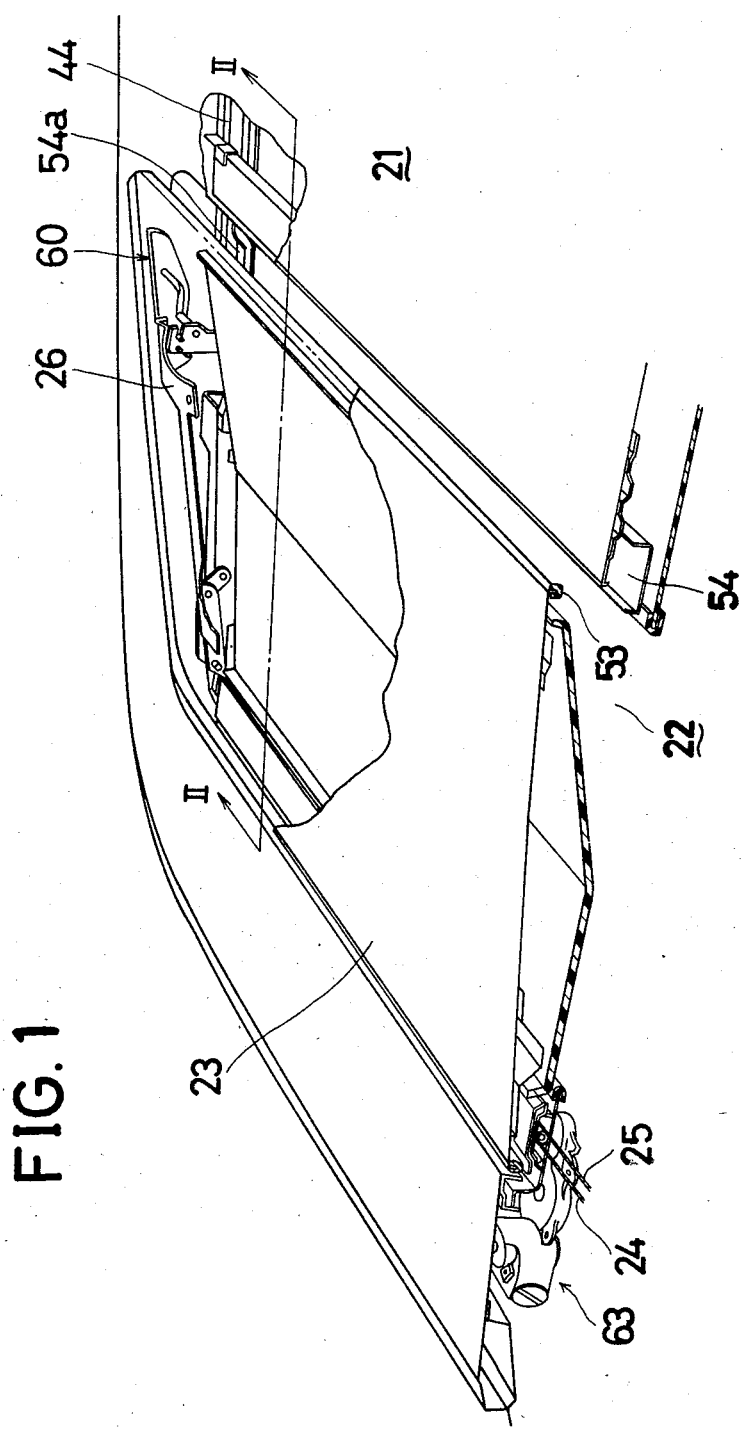
FIG. 1 is a partial perspective view of a movable roof apparatus for vehicles according to the invention.

Now referring to FIG. 1, a fixed roof 21 of a vehicle is provided with an aperture 22 wherein the aperture 22 and a rim portion 21a of aperture 22 is opened and closed by the slidable or tiltable movement of a movable roof 23. A driving mechanism 63 is mounted on the roof 21 and a pair of driving cables 24 and 25 are moved frontward and backward along the aperture 22 by a motor (not shown) of the driving mechanism 63. The driving cable 24 is operatively connected with a bracket 26 mounted on one side of the movable 23 through a cam mechanism 60. Namely, the movable roof 23 is moved by the driving mechanism 63.

As shown in FIG. 2a, the front end of the bracket 26 is provided with a slot 27 inclined towards the front end. The slot 27 is engaged with a pin 28a of a front guide bracket 28. A front link 30 is disposed between the front guide bracket 28 and the bracket 26 and each end of the link 30 is respectively connected with the front guide bracket 28 by a pin 31 and the bracket 26 by a pin 32. The front guide bracket 28 is connected to a pair of sliding shoes 29, 29 made of resin material. The sliding shoes 29, 29 are slidably engaged with a guide rail 44 mounted on the roof 21 along the one side portion of the aperture 22 (as is shown in FIG. 1).

Accordingly, when the rear end of the movable roof 23 is lifted upwardly or downwardly, the link 30 is rotated around the pin 31 in the clockwise direction by the pin 32 as shown in FIG. 2a Since the pin 28a slides along the slot 27, the movable roof 23 is rotated around the pin 28a. When the movable roof 23 slides along the roof 21, the pins 28a, 31 and 32 are positioned in a linear state. Thus, the front guide bracket 28 is moved with the movable roof 23.

Figure 3:
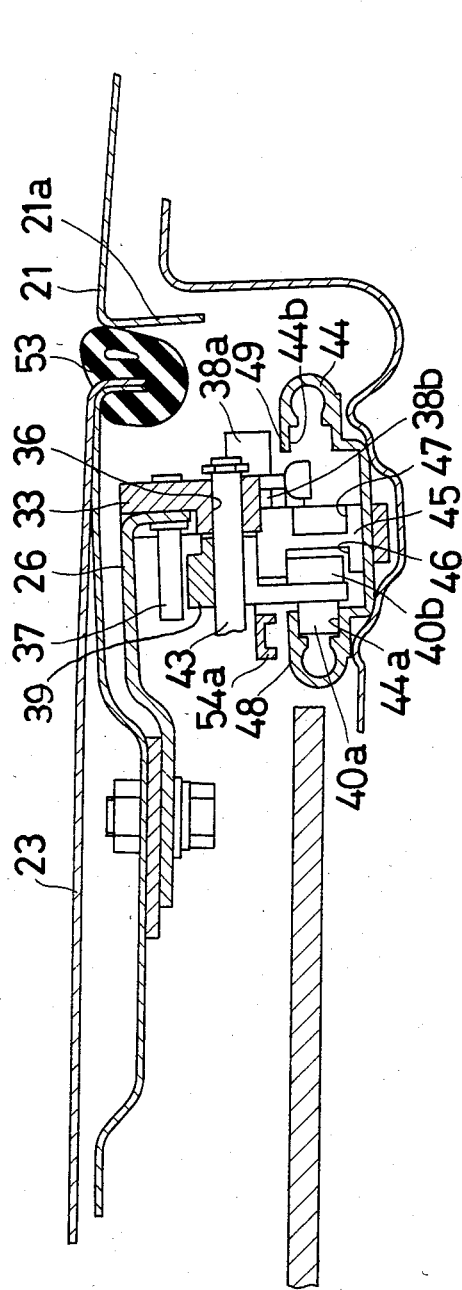
FIG. 3 is a partial enlarged sectional view taken along line III—III shown in FIG. 2a and showing the cam mechanism of the driving mechanism.

On the other hand, as shown in FIG. 2a, a pin 38 is mounted on the rear end of the bracket 26. A head portion 38a of the pin 38 is shown in FIG. 3. In opening operation of movable roof 23, head portion 38a can be repositioned so as to slidably engage with a first guide groove 44b of the guide rail 44. Thus, the movable roof 23 will slide along the guide rail 44 without an oscilating motion. Further, a cam plate 33 is fixed on the bracket 26 by pins 34 and 35. A cam groove 36 is formed in the cam plate 33 and a tilt pin 37 is provided for tilting the movable roof 23 is mounted on the cam plate 33.

A rear shoe 41 is integrally formed on the driving cable 24 and a roller pin 40 are respectively slidably disposed in the guide rail 44. Particularly, as shown in FIG. 3, a head portion 40a of the roller pin 40 is slidably engaged with second guide groove 44a of the guide rail 44. A lift link 39 for lifting the movable roof 23 is rotatably connected with the rear shoe 41 by a pin 41a in the rear end thereof and fixedly connected with the roller pin 40 in the front end thereof. Thus, the lift link 39 is movable along the guide rail 44. An arcuate recess portion 42 engageable with the tilt pin 37 is formed on the upper side of the lift link 39. Further, a cam pin 43 mounted on the lift link 39 is shaped like a crank and the top of the cam pin 43 is slidably engaged with the cam groove 36 of the cam plate 33. Since the rear shoe 41 is slidably engaged with the guide groove 44a and 44b of the guide rail 44, the link 39 is linearly moved along the guide rail 44 in accordance with the movement of the driving cable 24. Namely, the cam pin 43 is also linearly moved in the cam groove 36 of the cam plate 33.

In a cam mechanism which comprises the cam groove 36 and the cam pin 43, the cam groove 36 includes a horizontal part and an inclined part which extends upwardly toward the rear end of the movable roof 23. The horizontal part of the cam groove 36 includes a horizontal portion 36a, a first slightly inclined portion 36b which extends upwardly toward the rear end of the movable roof 23, and a second slightly inclined portion 36c descending toward the rear end of the movable roof 23. The inclined part forms a third inclined portion 36d. The third inclined portion 36d is sufficiently slanted.

The connecting portion of the first or second inclined portions 36b, 36c is formed at a slightly upward position from the horizontal portion 36a. The top position of the third inclined portion 36d is formed at the upward position from the horizontal portion 36a and the lower position of the third inclined portion 36d is formed at the same position of the horizontal portion 36a. Therefore, in accordance with the linear movement of the cam pin 43, the movable roof 23 is lifted upwardly or downwardly with the oscilating motion.

Further, the approximate center position of the second inclined portion 36c provides a second engaging position 61c where the movable roof 23 is fitted in the aperture 22 and the aperture 22 is closed. The top position of the first inclined portion 36b or the second inclined portion 36c provides a downward passing position 61b for the downward movement of the movable roof 23 where the movable roof 23 is positioned at the slightly downward side of the roof 21. The central position of the first inclined portion 36b provides a first engaging position 61a for downward movement of the movable roof 23 where the movable roof 23 is fitted in the aperture 22 in accordance with the downward movement of the movable roof 23 caused by the sliding movement of the cam pin 43 within the first inclined portion 36b in the backward direction.

The connecting portion of the second and third inclined portions 36c, 36d provides an upward passing position 61d where the movable roof 23 is positioned at the slightly upward side of the roof 21. The third inclined portion 36d provides a first engaging position 61e for the upward movement of the movable roof 23 caused by the sliding movement of the cam pin 43 within the second inclined portion 36c in the front direction.

A guide block 45 is mounted in the guide rail 44. Both side of the guide block 45 are respectively provided with slant grooves 46 and 47. The slant groove 46 is slidably engaged with the head portion 40b of the pin 40 and the slant groove 47 is slidably engaged with the head portion 38b of pin 38. Both grooves 47 and 46 are respectively opened and both flanges 48 and 49 of the guide rail 44 are respectively recessed at the position where the guide block 45 is located. Thus, both pins 38 and 40 are disengagable from the guide rail 44 by being raised along the slant grooves 47 and 46 in accordance with the forward movement of the movable roof 23. More particularly, in accordance with the upward movement of the pin 40, the link 39 is rotated around the pin 41a. The arcuate slot 42 of the link 39 is engaged with the tilt pin 37 and the rear portion of the movable roof 23 will also be lifted upwardly.

The inner side of the guide block 45 is further provided with flanges 50 and 50b. The flanges 50 and 50b are extended horizontally and rectangular recess 50a is formed therebetween. The recess 50a is, as shown in FIG. 2a, engageable with a stopper piece 52 which is mounted on a spring 51. One end of the spring 51 is connected with the front guide 28 and an opposite end of the spring 51 is extended toward the pin 38. Thus, when the pin 38 is engaged with the groove 44b of the guide rail 44, the spring 51 is bent downwardly by the lower end portion 26a of the bracket 26 and the stopper piece 52 is maintained in the disengaged state. But, when the pin 38 is raised by the slant groove 47, the spring 51 is freed from the end portion 26a. Thus, the stopper piece 52 is engaged with the recess 50a and by engagement between the stopper piece 52 and the recess 50a, the front guide 28 is fixed to the guide rail 44 as shown in FIG. 2a.

An arm 54a is provided on the front guide 28 and the water pipe 54 is connected to the arm 54a. Thus, since the waterpipe 54 moves with the movable roof 23, the water pipe 54 can catch the water from the movable roof 23.

The above embodiment operates as follows: Usually, the movable roof 23 is fitted in the aperture 22 of the roof 21 and the aperture 22 is closed by the movable roof 23 as shown in FIG. 2a. The lift link 39 is moved backwards by the driving cable 24. The cam pin 43 mounted on the link 39 engages with the third inclined portion 36d instead of the horizontal part of the cam groove 36. The cam pin 43 slides horizontally as the pin 40 of the lift link 39 is engaged with the guide groove 44a. The movable roof 23 is moved downwardly around the front end of the movable roof 23 in accordance with the rearward movement of the link 39. Thus, the movable roof 23 is removed from the aperture 22.

Figure 4:
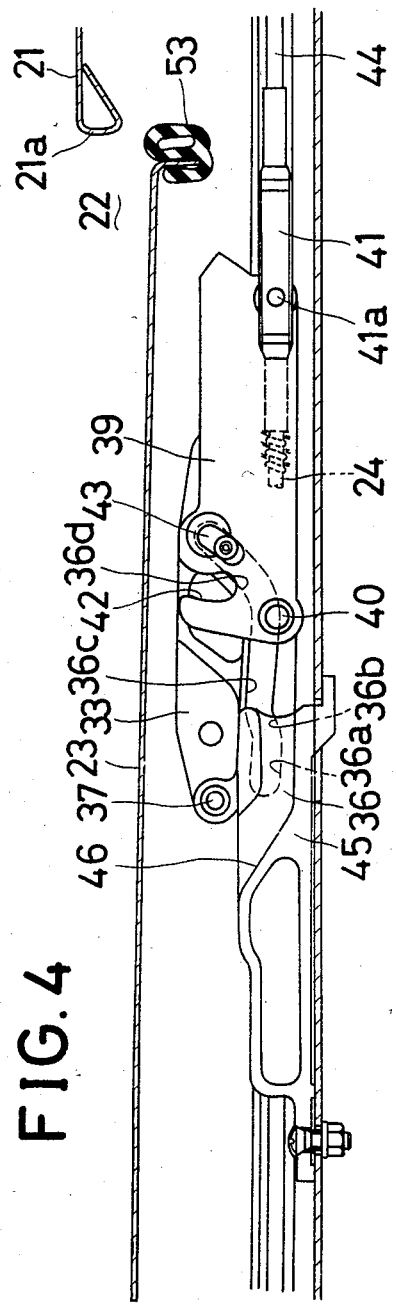

The pin 38 of the movable roof 23 moves down within the slant groove 46 of the guide block 45 by the downward movement of the movable roof 23. As the spring 51 is pushed by the movable roof 23, the stopper piece 52 is disengaged from the recess 50a of the guide block 45. The front guide 28 becomes slidable along the guide rail 44 through the shoes 29, 29 and the pin 38 is slidably engaged with the guide groove 44b of the guide rail 44. As the movable roof 23 can not turn, the link 39 is movable with the movable roof 23 through the abuttment between the cam pin 43 and the cam groove 36 as shown in FIG. 4. By the further backward movement of the link 39 the movable roof 23 is slid rearwardly along the inner side of the roof 21. Therefore, the aperture 22 is opened by the sliding movement of the movable roof 23.

Figure 7:
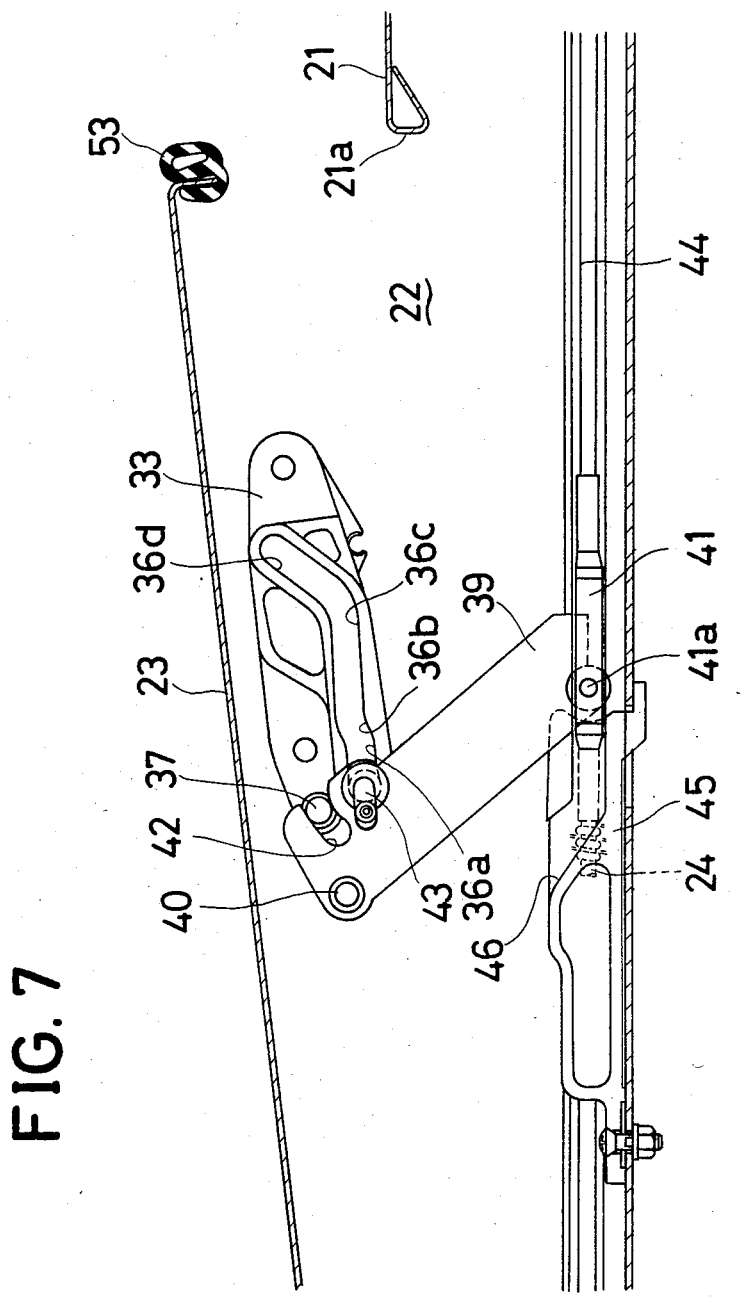

While the cable 24 is moved forwards in the closed state as shown in FIG. 2b, the pin 40 travels up the slant groove 46. The link 39 is rotated about the pin 41a with the forward movement thereof. By further forward movement of the cable 24, the arched recess 42 of the link 39 is engaged with the tilt pin 37. Therefore, as the front guide 28 is fixed to the guide rail 44 by the engagement of the stopper piece 52 and the recess 50a, the movable roof 23 is positioned up around the front end of the roof 21. The movable roof 23 is removed from the aperture 22 and tilted against the roof 21 so that the aperture 22 is opened as shown in FIG. 7.

Further, in the above embodiment both sides of the roof 21 (not shown in FIG. 1) are symmetrically constructed. Thus, one side of the movable roof 23 is moved by the cable 24 as shown in FIG. 1 and the other side of the movable roof 23 is moved by the cable 25 interlocking with the cable 24.

The aperture 22 is closed by the movable roof 23 as follows. The movable roof 23, which is positioned at the inner side of the roof 21 so as to open the aperture 22, is slid towards the closed position as shown in FIG. 2a by the forward movement of the cable 24. When the movable roof 23 is positioned below the aperture 22 as shown in FIG. 4, the pin 38 goes up the slant groove 47 or the movable roof 23 will be movable upwardly. Also, the front guide 28 becomes fixed to the guide rail 44 as the stopper piece 52 engages with the recess 50a.

Since the cam pin 43 of the link 39 slides forwardly in the third inclined portion 36d of the cam groove 36, the movable roof 23 will swing upwardly around the front end thereof. When the cam pin 43 is positioned at the first engaging position 61e of the third inclined portion 36d, the movable roof 23 is disposed in the aperture 22 as shown in FIG. 5. However, as shown in FIG. 5, the end portion of the weather strip 53 is deformed by the inner peripheral surface 21a of the roof 21 around the aperture 22. Therefore, the weather strip 53 is not perfectly disposed between the both rim portions of the movable roof 23 and roof 21.

By the further forward movement of the cable 24 the cam pin 43 is positioned at the upward passing position 61d of the cam groove 36. As shown in FIG. 6, the movable roof 23 is positioned in a slightly raised position against the roof 21. The end portion of the weather strip 53 is properly disposed in the aperture 22 and elastically abutted against the rim portion of the aperture 22. By further forward movement of the cable 24, the cam pin 43 is slid in the the second inclined portion 36c and positioned at the second engaging position 61c. The movable roof 23 is turned downwardly around the front end thereof and fitted in the aperture 22. Thus, the aperture 22 is closed by the movable roof 23. Further, since the weather strip 53 is properly disposed between the both rim portions of the movable roof 23 and roof 21, no misalignment is caused between the the movable roof 23 and the roof 21 and the airtightness of the weather strip is assured.

Figure 8:
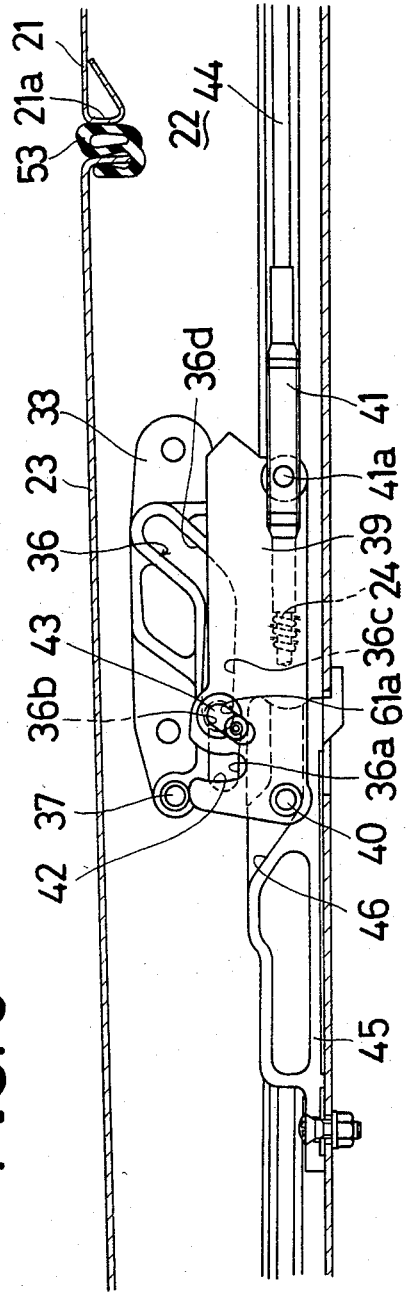

While the movable roof 23 is positioned in the tilted state at the outer side of the roof 21 as shown in FIG. 7 so as to open the aperture 22, the movable roof 23 is turned downwardly by the backward movement of the cable 24 and the aperture 22 is closed by the movable roof 23 as shown in FIG. 2a. Namely, in accordance with rearward movement of the cable 24, the link 39 is slid rearward along the guide rail 44 and further rotated downwardly around the pin 41a. When the cam pin 43 of the link 39 is positioned at the first engaging position 61a in the horizontal portion 36a of the cam groove 36, the movable roof 23 is disposed in the aperture 22. However, as shown in FIG. 8, the end portion of the weather strip 53 is deformed by the outer surface of the roof 21 around the aperture 22. Therefore, the weather strip 53 is not perfectly disposed between the rim portion of the movable roof 23 and roof 21.

Figure 9:
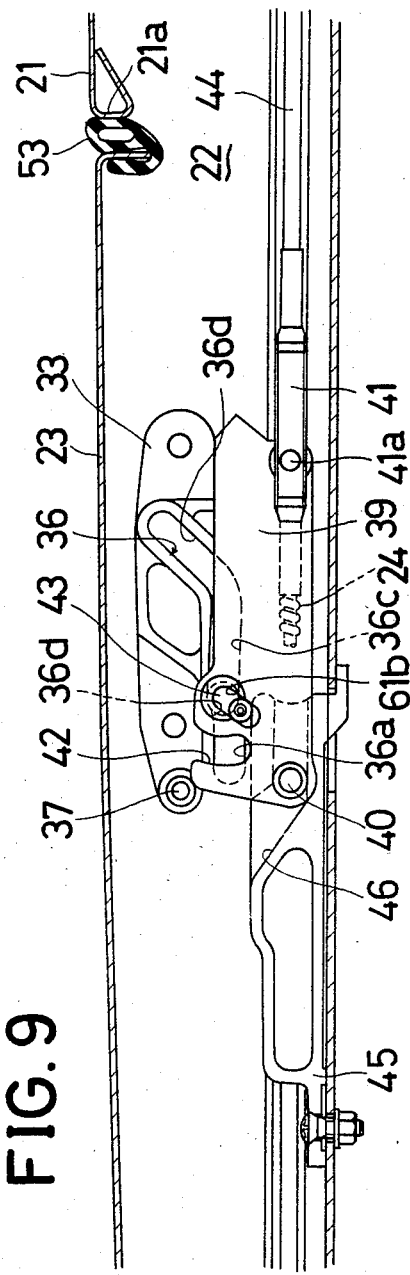

By further rearward movement of the cable 24, the pin 40 of the link 39 shifts downwardly within the slant groove 46 and the link 39 is slidable along the guide rail 44. The cam pin 43 of the link 39 slides rearwardly in the first inclined portion 36b of the cam groove 36. The movable roof 23 is turned downwards around the front end thereof. When the cam pin 43 is positioned at the downward passing position 61b of the first inclined portion 36b, the movable roof 23 is, as shown in FIG. 9, positioned in a slightly downward position against the roof 21. The end portion of the weather strip 53 is fitted within the aperture 22 and elastically abuts against the rim portion of the aperture 22. By the further rearward movement of the cable 24, the cam pin 43 is slid in the second inclined portion 36c and positioned at the second engaging position 61c as shown in FIG. 2b. The movable roof 23 is turned upwardly around the front end thereof and fitted in the aperture 22. Thus, the aperture 22 is closed by the movable roof 23. Further, since the weather strip 53 is properly disposed between both rim portions of the movable roof 23 and roof 21, no misalignment is generated between the the movable roof 23 and the roof 21 and airtightness of the weather strip is assured.

As mentioned above, whenever the aperture 22 is closed by the sliding or tilting movement of the movable roof 23, the movable roof 23 is oscillated in the aperture 22 through the cam mechanism 60 by the driving mechanism 63. Therefore, the weather strip 53 provided around the movable roof 23 is fitted between the roof 21 and the movable roof 23.

Obviously, numerous modifications and variations of the present invention are possible in light of the above teachings. It is therefore to be understood that within the scope of the appended claims, the invention may be practiced otherwise than as specifically described herein.

What is claimed is:

1. A movable roof apparatus for vehicles, comprising:
   a fixed roof on said vehicle wherein said roof has an aperture formed therein;
   a movable roof disposed in said aperture:
   sealing means provided on a rim portion of one of said fixed roof and said movable roof so as to position said movable roof in said aperture in an airtight state;
   a cam mechanism for moving said movable roof so as to open or close said aperture;
   a driving mechanism provided on one of said fixed roof and said movable roof and operatively connected with the other of said fixed roof and said movable roof through said cam mechanism, wherein said cam mechanism is positionable in an open position wherein said movable roof is removed from said aperture and positioned at one side of said fixed roof, a first engaging position wherein said movable roof is disposed in said aperture, a passing position wherein said movable roof is slightly passed through said fixed roof and is positioned at an upper side of said fixed roof, and a second engaging position wherein said movable roof is disposed in said aperture, said open, first engaging, passing and second engaging positions being operable in series, said cam mechanism further comprising a cam groove and a cam pin slidably engaged therewith wherein one of said cam groove and said cam pin is disposed on said one of said movable roof and said fixed roof and the other of said cam groove and said cam pin is movably disposed on the other of said movable roof and said fixed roof and operatively connected with said drive mechanism, and wherein said cam groove includes a first and second upwardly inclined portion and a downwardly inclined portion interconnecting said first and second upwardly inclined portions.

2. A movable roof apparatus for vehicles as set forth in claim 1, wherein said first upwardly inclined portion and said downwardly inclined portion are located towards a front side portion of said vehicle.

* * * * *